Walter J. Brown
INVENTOR.

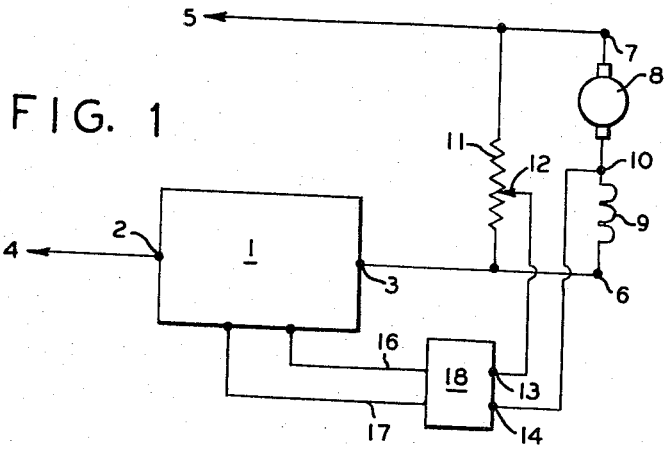
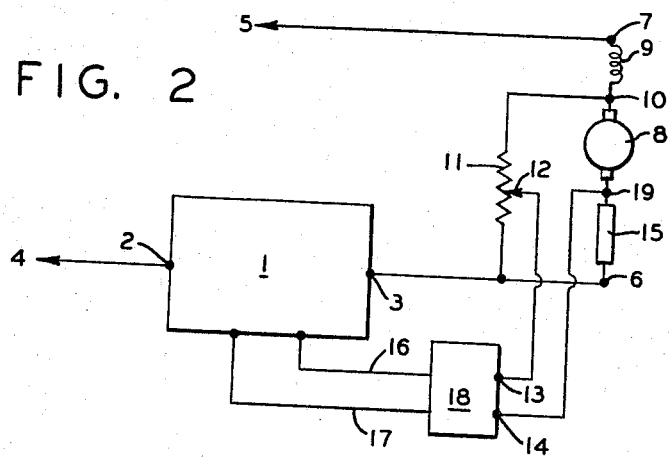
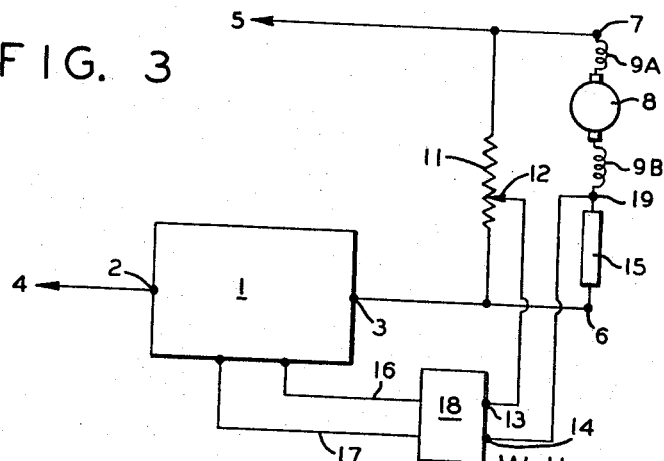
Walter J. Brown
INVENTOR.

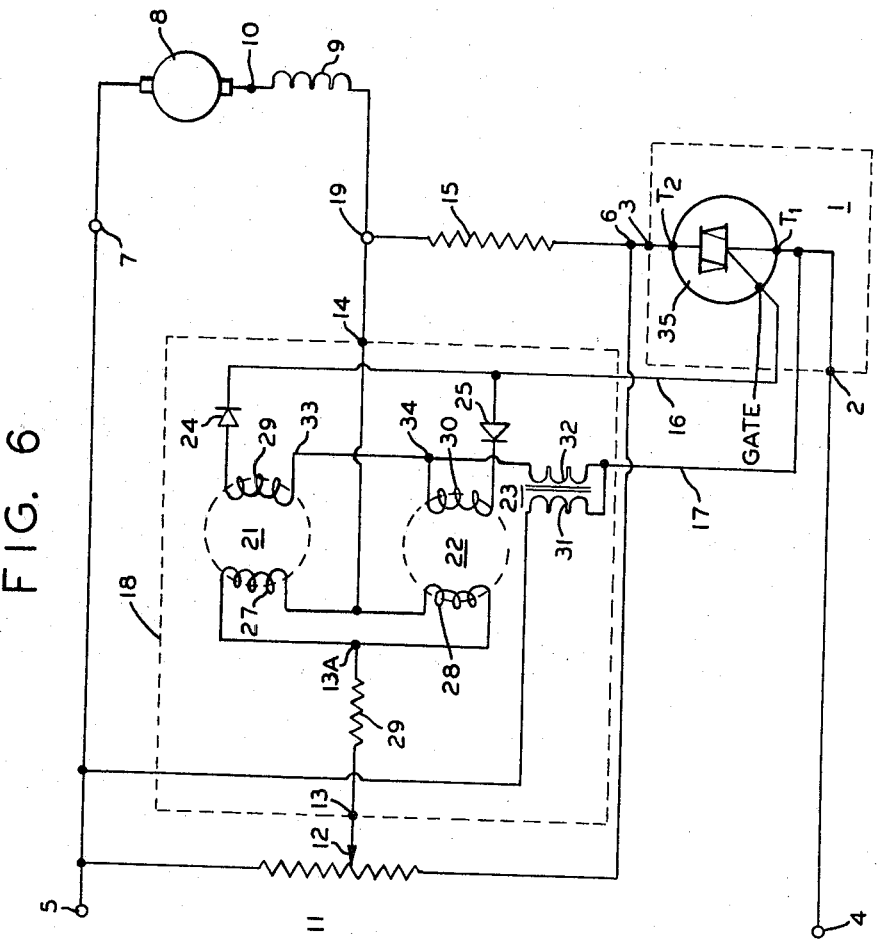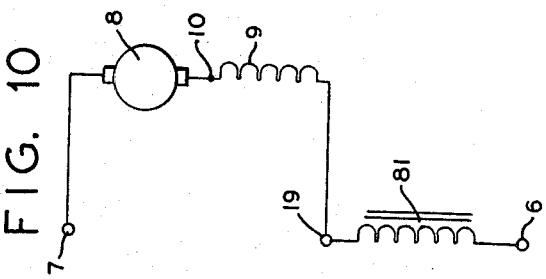
Walter J. Brown
INVENTOR.

Walter J. Brown
INVENTOR.

United States Patent Office 3,331,004
Patented July 11, 1967

3,331,004
CONTROL SYSTEM FOR SERIES-WOUND
ALTERNATING CURRENT MOTORS
Walter J. Brown, 71 Gurley Road,
Stamford, Conn. 06902
Filed July 3, 1964, Ser. No. 380,169
23 Claims. (Cl. 318—245)

This invention refers generally to a control circuit for electric motors. More particularly, the invention is an improvement upon the invention described in my U.S. Patents Nos. 2,733,395, 2,777,106, 2,799,818 and 2,799,819 relating to speed controlling systems for series-wound electric motors, and to variable speed electric motor drives incorporating such control systems and motors.

Reference may be had, for instance, to Patent No. 2,733,395 column 4, lines 16–20 in which it is stated that "the converter 1 has been described as one having an asymmetric or D.C. output. Arrangements using a converter with an A.C. output are not excluded from the invention, but a converter having a D.C. output appears more practicable and has therefore been described." Quite specifically, the subject invention is directed to means for controlling and regulating a converter with an A.C. output in such manner as to maintain the speed or tend to maintain the speed of a universal, or AC-DC motor or a series wound A.C. motor at a reasonably constant predetermined speed upon variation of the mechanical load which is applied to the motor.

In the drawings:

FIG. 1 is a schematic circuit diagram showing a basic circuit according to the invention.

FIG. 2 is a schematic circuit diagram showing an alternative basic circuit.

FIG. 3 is a schematic circuit diagram showing a further alternative basic circuit.

FIG. 4 shows a modification of the basic circuit of FIG. 1.

FIG. 5 shows a modification of the basic circuit of FIG. 3.

FIG. 6 is a detailed circuit diagram of the invention.

FIGS. 7(a), 7(b) and 7(c) show the voltage waveforms occurring at principal points in the circuit.

Figure 8:
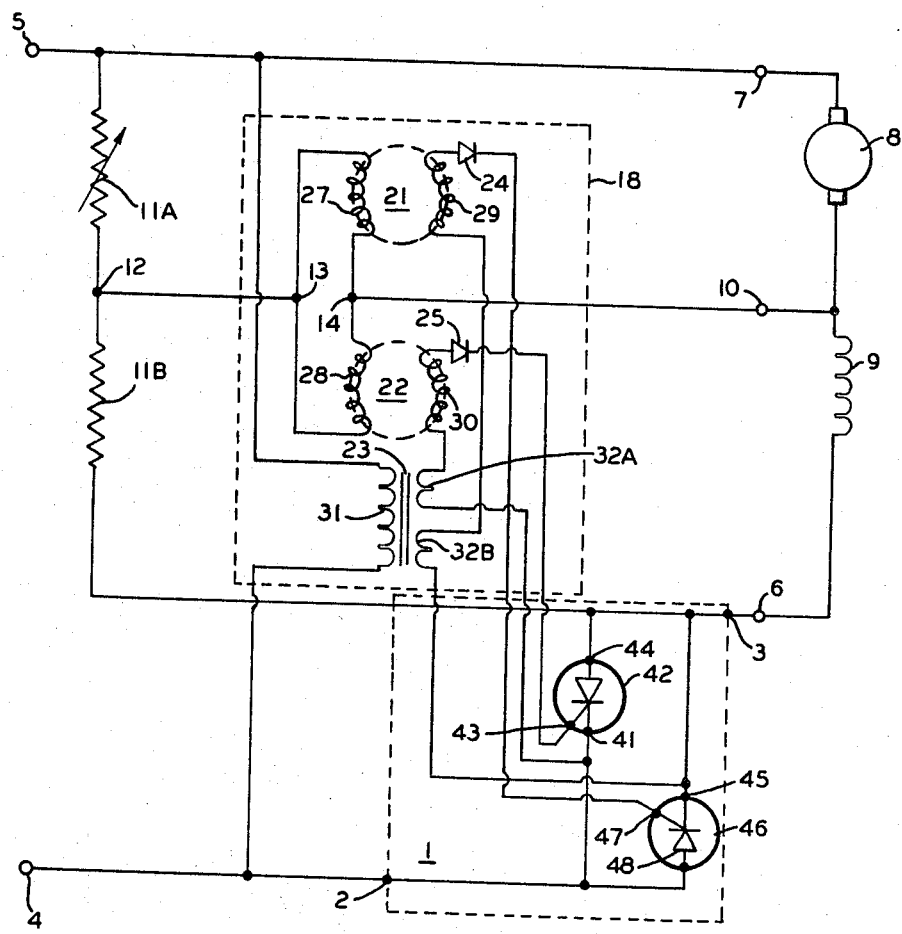

FIG. 8 is an alternative completely detailed circuit.

Figure 9:
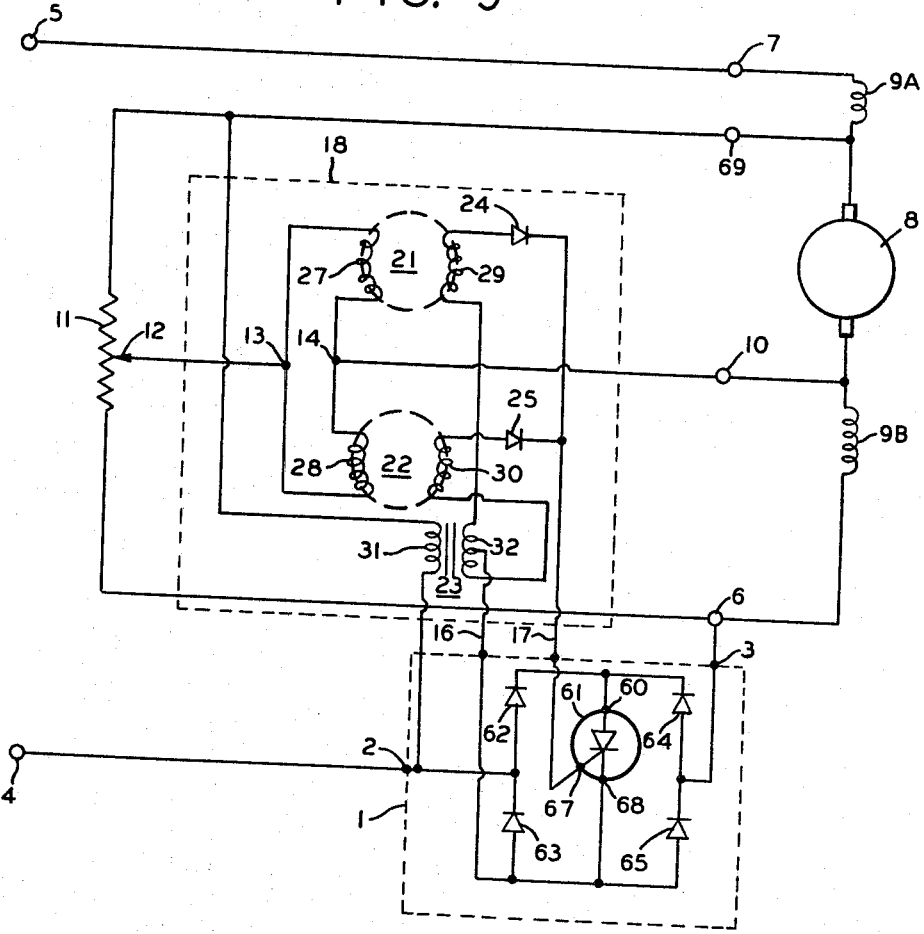

FIG. 9 is a further alternative detailed circuit diagram.

FIG. 10 is an alternative arrangement of a portion of the circuit of FIG. 6.

Referring now to the figures, FIG. 1 illustrates my invention in one of its basic forms. The rectangle 1 denotes an AC regulating device having an input power terminal 2 and an output power terminal 3. Input terminal 2 is connected to one side 4 of an AC supply source and output terminal 3 is connected to terminal 6 of a motor circuit. The other side 5 of the AC supply source is connected to terminal 7 of the motor circuit. The motor circuit in this case comprises the armature 8 and field winding 9 of a series wound AC or universal or AC-DC motor, serially connected through a common point 10.

A potential divider 11 is connected across the motor circuit and has a tap 12. Tap 12 is connected to a control signal terminal 13 of a phase-discriminating control device 18, and common point 10 is connected to the control signal terminal 14 of said phase-discriminating device 18.

The phase-discriminating control device 18 is connected by at least two conductors 16 and 17 to the AC regulating device 1 and is so designed as to vary the alternating current passing through the regulating device 1 to the motor circuit 6–7 in accordance with small changes in amplitude of the AC signal applied to control terminals 13 and 14, and in accordance with the phase relationship of said control signal to the AC source 4–5. With one such phase relationship the output of the regulating device 1 is varied in one sense in dependence upon the amplitude of the control signal; with the opposite phase relationship the output of the regulating device is varied in the opposite sense, or in some cases is not varied at all, in dependence upon the amplitude of the control signal.

Accordingly, when connected with the correct phase relationship, the system acts as a negative feedback network and regulates the AC output current so as to maintain a small AC error signal between terminals 13 and 14, and hence between points 12 and 10. By designing the control signal circuit so that a small change of signal amplitude applied to terminals 13–14 creates a large change of current through the regulating device 1, the AC error signal between points 12 and 10 can be made negligible, so that the AC motor armature voltage is substantially equal to the AC voltage existing on the potential divider between tap 12 and terminal 7, and the AC motor field voltage is substantially equal to the voltage between tap 12 and terminal 6. Thus, a constant ratio of AC motor armature voltage to AC motor field voltage is approximately maintained. This tends to regulate the motor speed to a constant value which is independent of motor load, since the motor speed is roughly proportional to armature voltage and inversely proportional to magnetic flux and therefore to field voltage—neglecting the effects of magnetic saturation; accordingly when the system operates to maintain a substantially constant ratio of AC armature voltage to AC field voltage, the speed will tend to remain constant in spite of variations of load.

FIG. 2 shows an alternative arrangement of the motor circuit. An impedance 15 is connected between the regulator output terminal 3 and the motor armature 8 at junction point 19; the impedance 15 may comprise a resistor, a choke coil, or a combination of both. The potential divider 11 is connected across a portion of the motor circuit comprising the armature 8 and the series impedance 15, between the common point 10 and the motor circuit terminal 6. The control signal terminals 13 and 14 are connected to the potential divider tap 12 and to junction point 19 respectively. Again, this acts as a negative feedback network to maintain a negligible error signal between potentiometer tap 12 and junction point 19. Accordingly, the AC motor armature voltage is substantially equal to the AC voltage existing on the potential divider between tap 12 and common point 10; the voltage between tap 12 and terminal 6 is substantially equal to the voltage drop across the series impedance 15, which voltage is proportional to the field current, therefore approximately to the field flux. Accordingly, this arrangement tends to maintain a constant motor speed regardless of load variations, as explained with reference to FIG. 1.

FIG. 3 shows a further alternative arrangement which can be applied to standard universal or AC-DC or series wound AC motors without the need for bringing out a third terminal from the motor. The motor is here illustrated as having its armature 8 serially connected between two sections 9A and 9B of the field winding, as is customary with many universal motors. However, this circuit will operate equally well if all the field windings are serially connected to one end of the armature as shown in FIGS. 1 and 2. In FIG. 3, an impedance 15 is connected in series with the motor between output terminal 3 and junctions point 19, and the potential divider 11 is connected across the whole of the motor circuit, between terminals 6 and 7. This system operates to regulate the motor current so as to tend to maintain a constant ratio of total AC motor voltage to the AC motor current as sensed by the voltage drop in resistor 15, and this again tends to maintain a constant motor speed, regardless of the applied load.

FIG. 4 shows an alternative arrangement of the circuit of FIG. 1. In FIG. 4, the potential divider 11 is connected across the motor armature and only one section of the total field winding, 9B between terminal 6 and common point 10.

FIG. 5 shows an alternative arrangement of the circuit of FIG. 2. In FIG. 5 the field winding is split into two sections 9A and 9B. Potential divider 11 is connected between common point 10A and motor circuit terminal 6. Control signal terminal 14 is connected to common point 10B and control signal terminal 13 is connected to potential divider tap 12. The system regulates the ratio of armature voltage to the total voltage across field section 9B and series impedance 15 which again tends to maintain the motor speed independent of load.

FIG. 6 illustrates a circuit which I have successfully reduced to practice, using a silicon gate-controlled AC switch, as sold by the General Electric Company under the name "ZJ257 TRIAC." This is a three terminal device having power terminals $T_1$ and $T_2$ and a gate terminal. The device will conduct current from $T_2$ to $T_1$ when a positive (or negative) current is supplied to the gate; it will alternatively conduct current from $T_1$ to $T_2$ when a negative (or positive) current is supplied to the gate. I prefer to supply only a positive or a negative current respectively to the gate and to avoid supplying a negative or a positive current respectively to the gate as listed in parentheses hereinabove. For the purpose of initiating conduction in the controlled AC switch I prefer to use a magnetic trigger firing device, though my invention shall in no way be limited to such a device.

The circuit of FIG. 6 is basically similar to that of FIG. 3, and the corresponding elements are numbered accordingly. The AC regulating device 1 comprises a "TRIAC" as above described and the control device 18 is a phase-discriminating magnetic trigger shown within the dotted rectangle and comprising a pair of saturable transformers 21, 22, an excitation transformer 23, and a pair of diodes 24 and 25 with a common connection 16 to the gate of the TRIAC.

The saturable transformers 21 and 22 each comprises a core of toroidal or "DU" form, of "square loop" magnetic material with a primary or signal winding 27, 28 respectively, and a secondary or gate winding 29, 30 respectively.

The primary or signal windings 27 and 28 are connected in inverse parallel between the points 13A and 14; point 13A is connected through resistor 29 and terminal 13 to potentiometer tap 12; terminal 14 is connected to junction point 19.

The excitation transformer 23 has its primary winding 31 connected across the AC source 4–5; its secondary winding 32 delivers an output of approximately 5 volts RMS and one end is connected through conductor 17 to terminal $T_1$ of the TRIAC; the other end of said winding is connected to one end 33, 34 of the secondary or gate windings 29, 30 of each of the saturating transformers 21 and 22. The other ends of said secondary windings 29 and 30 are connected through diodes 24 and 25, with opposite polarities, through conductor 16 to the gate of the TRIAC 35.

The TRIAC 35 has its power input and output terminals $T_1$ and $T_2$ connected respectively to the AC source 4 and the motor circuit terminal 6; the other motor circuit terminal 7 is connected to the AC source terminal 5. The magnetic trigger applies positive and negative firing pulses during alternate half cycles through diodes 24 and 25 to the gate of the TRIAC, when terminal $T_2$ is alternately positive and negative with respect to terminal $T_1$.

The timing of said pulses with respect to the alternating voltage applied from source terminal 5 is variable in accordance with the AC "error signal" appearing across terminals 13 and 14 of the magnetic trigger. When suitably phased, the firing pulses are advanced as the AC error signal varies due to a slowing down of the motor, thus delivering more power to the motor and tending to maintain a constant motor speed.

FIGURES 7(a), 7(b) and 7(c) show the progressive advancing of the firing pulse, shown in solid shading, 101(a), 101(b) and 101(c) and of the TRIAC output shown in cross hatching 102(a), 102(b) and 102(c) as the amplitude of the AC error signal is varied, in the correct phase relationship, due to the motor slowing down owing to the application of mechanical load.

FIG. 8 details an alternative circuit which is basically similar to that shown in FIG. 1. The motor circuit comprises the armature 8, serially connected through a common point 10 with the field winding 9. The potential divider 11 here comprises two sections, 11A which is a variable rheostat and 11B which is a fixed resistor, serially connected with a tap 12 therebetween. The phase-discriminating control device is a magnetic trigger shown within the dotted rectangle 18. Tap 12 is connected at 13 to the inversely paralleled primary windings 27 and 28 of saturating transformers 21 and 22. The excitation transformer 23 has two isolated secondary windings 32A and 32B.

The regulating device comprises a pair of silicon controlled rectifiers (SCR) connected in inverse parallel in the dotted rectangle 1. Transformer winding 32A is connected from the cathode 41 of a silicon controlled rectifier 42, through secondary windings 30 of saturating transformer 22, and through diode 25 to the gate 43 of said SCR; the SCR anode 44 is connected to the motor circuit terminal 6 and its cathode 41 is connected to AC source terminal 4.

Transformer winding 32B is connected from the cathode 45 of SCR 46 through winding 32B of excitation transformer 23 to the secondary 29 of saturating transformer 21 and thence through diode 24 to the gate 47 of SCR 46; the anode 48 of said SCR is connected to AC source terminal 4.

Current can flow during alternate half cycles, downwards through SCR 42 and upwards through SCR 46. The current through each SCR is controlled by varying the time of "firing" or initiation of conduction, by means of pulses similar to those shown in FIG. 7, except that the negative-going pulses in FIG. 7 are replaced by positive-going pulses to the inversely connected SCR 46 of FIG. 8; for this reason the diodes 24, 25 in the magnetic trigger of FIG. 8 are polarized so as to deliver positive pulses to the SCR gates 43 and 47 during alternate half cycles.

FIG. 9 shows a further alternative in which the AC regulating device 1 comprises a single SCR 61 enclosed within a bridge circuit comprising diodes 62, 63, 64 and 65 and the SCR is fired twice during each cycle. Alternating current can be transmitted from source terminal 4 during its positive half cycle through diode 62, SCR anode 60, SCR cathode 68 and diode 65 to motor circuit terminal 6; during the alternate half cycles, alternating current can be transmitted from source terminal 5, through the motor circuit 7–6 and thence through diode 64, SCR anode 60, SCR cathode 68 and diode 63 to AC source terminal 4; during each half cycle the current flows from anode to cathode of the SCR.

The phase-discriminating magnetic trigger is shown within the dotted rectangle 18. It controls the SCR output by positive pulses in each half cycle, derived from opposite ends of the center-tapped excitation transformer secondary 32, alternately through saturable transformer secondaries 29, 30 and diodes 24, 25 which are both positive-going and have their outputs paralleled and connected to the gate 67 of the single SCR 61; the center tap of excitation transformer secondary 32 is connected to the SCR cathode 68.

In FIG. 9 the potential divider 11 is connected across the armature at common point 69, and one field winding 9B of the motor and the signal circuit from 14 is connected to the common point 10 which is between the armature 8 and the portion 9B of the field winding, in a configuration similar to that shown in FIG. 4.

FIG. 10 shows an alternative arrangement of the motor circuit which forms a part of FIG. 6. In FIG. 10 the series resistor 15 is replaced by a choke coil 81.

What is claimed is:

1. A control system for a series-wound alternating current motor comprising:
   an alternating current regulating means having a power input terminal for connection to a source of alternating current, a power output terminal for connection to a motor circuit, and means for accepting a control signal for controlling the power flow between said terminals;
   a motor circuit including the series connection of an armature and a field winding for connection to said power output terminal and a source of alternating current;
   potential sensing means coupled in parallel with at least a portion of said motor circuit;
   a phase discriminating amplitude-responsive control means for delivering a control signal which is responsive to an alternating current signal;
   said control means coupled to said potential sensing means and to said motor circuit for obtaining therefrom an alternating current signal comprising the difference in alternating current potential existing between a point at said potential sensing means and a point at said motor circuit;
   and means for coupling said regulating means to said control means for controlling the power flow between said terminals in response to said control signal.

2. A control system as set forth in claim 1 wherein the alternating current regulating means comprises a solid state device having a pair of power terminals and at least one gating terminal;
   said device capable of conducting current in either direction between its power terminals, in response to positive and negative control currents applied to at least one gating terminal from said control means.

3. A control system as set forth in claim 1 wherein the alternating current regulating means comprises a pair of controlled rectifiers connected in inverse parallel between said power input and power output terminals, each of said rectifiers having a control terminal to which a control signal is applied by said control means.

4. A control system as set forth in claim 1 wherein the alternating current regulating means comprises a controlled rectifier, and a diode bridge having alternating current input and output terminals and having positive and negative direct current terminals;
   said controlled rectifier being connected across said direct current terminals;
   and said controlled rectifier having a control terminal to which a control signal is applied by said control means to vary the conduction of said rectifier during each half cycle of the alternating current supply.

5. A control system for a series-wound alternating current motor comprising:
   an alternating current regulating means having a power input terminal for connection to a source of alternating current, a power output terminal for connection to a motor circuit, and means for accepting a control signal for controlling the power between said terminals;
   a motor circuit including the series connection of an armature and a field winding for connection to said power output terminal and a source of alternating current;
   potential sensing means coupled in parallel with at least a portion of said motor circuit;
   a phase discriminating amplitude-responsive control means for delivering a control signal which is responsive to an alternating current signal;
   said control means coupled to said potential sensing means and to said motor circuit for obtaining therefrom an alternating current signal comprising the difference in alternating current potential existing between a point at said potential means and a point at said motor circuit;
   and means for coupling said regulating means to said control means for controlling the power flow between said terminals in response to the phase and amplitude of said alternating current signal.

6. A control system for a series-wound alternating current motor comprising:
   an alternating current regulating means having a power input terminal for connection to a source of alternating current, a power output terminal for connection to a motor circuit, and means for accepting a control signal for controlling the power flow between said terminals;
   a motor circuit including the series connection of an armature and a field winding for connection to said power output terminal and a source of altertattng current;
   potential sensing means having a tap, coupled in parallel with at least a portion of said motor circuit;
   a phase discriminating amplitude-responsive control means for delivering a control signal which is responsive to an alternating current signal;
   said control means coupled to said tap and to the common point between said armature and field winding for obtaining therefrom an alternating current signal comprising the difference in alternating current potential existing between said tap and said common point;
   and means for coupling said regulating means to said control means for controlling the power flow between said terminals in response to the phase and amplitude of said alternating current signal.

7. A control system as set forth in claim 6 wherein said potential sensing means comprises a resistor having a moveable tap.

8. A control system for a series-wound alternating current motor comprising:
   an alternating current regulating means having a power input terminal for connection to a source of alternating current, a power output terminal for connection to a motor circuit, and means for accepting a control signal for controlling the power flow between said terminals;
   a motor circuit including the series connection of an armature, a field winding, and current sensing means for connection to said power output terminal and a source of alternating current;
   potential sensing means coupled in parallel with at least a portion of said motor circuit;
   a phase discriminating amplitude-responsive control means for delivering a control signal which is responsive to an alternating current signal;
   said control means coupled to said potential sensing means and to said motor circuit for obtaining therefrom an alternating current signal comprising the difference in alternating current potential existing between a point on said potential means and a point on said motor circuit;
   and means for coupling said regulating means to said control means for controlling the power flow between said terminals in response to the phase and magnitude of said alternating current signal.

9. A control system for a series-wound alternating current motor comprising:
   an alternating current regulating means having a power input terminal for connection to a source of alternating current, a power output terminal for connection to a motor circuit, and means for accepting a control signal for controlling the power flow between said terminals;

a motor circuit including the series connection of an armature, a field winding, and current sensing means for connection to said power output terminal and a source of alternating current;

potential sensing means, having a tap, coupled in parallel with at least a portion of said motor circuit;

a phase discriminating amplitude-responsive control means for delivering a control signal which is responsive to an alternating current signal;

said control means coupled to said tap and to said motor circuit for obtaining therefrom an alternating current signal comprising the difference in alternating current potential existing between said tap and a point at said motor circuit;

and means for coupling said regulating means to said control means for controlling the power flow between said terminals in response to the phase and amplitude of said alternating current signal.

10. A control system as set forth in claim 9, wherein said current sensing element comprises an impedance, and said potential sensing means comprises resistive means having a tap.

11. A control system as set forth in claim 9 wherein said current sensing means comprises a resistor and said potential sensing means comprises a resistor having a moveable tap.

12. A control system for a series-wound alternating current motor comprising:

a gated alternating current regulating means having a power input terminal for connection to a source of alternating current, a power output terminal for connection to a motor circuit, and means for accepting gating pulses of variable timing for periodically controlling the duration of power flow between said terminals;

a motor circuit including the series connection of an armature and at least one field winding, for connection between said power output terminal and a source of alternating current;

potential sensing means, having a tap, coupled in parallel with at least a portion of said motor circuit;

a phase discriminating amplitude-responsive control means for delivering gating pulses of variable timing in response to an alternating current signal;

said control means coupled to said tap and to said motor circuit for obtaining therefrom an alternating current signal comprising the difference in alternating current potential existing between said tap of said potential means and a point on said motor circuit;

and means for coupling said regulating means to said control means for controlling the timing of the gating pulses and the power flow between said terminals in response to said alternating current signal.

13. A control system as set forth in claim 12 wherein said control means is coupled to said motor circuit at the common point between said armature and field winding.

14. A control system for a series-wound alternating current motor comprising:

a gated alternating current regulating means having a power input terminal for connection to a source of alternating current, a power output terminal for connection to a motor circuit, and means for accepting gating pulses of variable timing for periodically controlling the duration of power flow between said terminals;

a motor circuit including the series connection of an armature and at least one field winding, and a current sensing means, for connection between said power output terminal and a source of alternating current;

potential sensing means, having a tap, coupled in parallel with at least a portion of said motor circuit;

a phase discriminating amplitude-responsive control means for delivering gating pulses of variable timing in response to an alternating current signal;

said control means coupled to said tap and to said motor circuit for obtaining therefrom an alternating current signal comprising the difference in alternating current potential existing between said tap of said potential means and a point on said motor circuit;

and means for coupling said regulating means to said control means for controlling the timing of the gating pulses and the power flow between said terminals in response to said alternating current signal.

15. A control system as set forth in claim 14 wherein said current sensing means comprises an impedance and said control means is coupled to said motor circuit at a point in proximity to said impedance.

16. A control system for an alternating current motor having armature and field windings serially connected, and adapted for connection of said motor between an alternating current source and a controlled power terminal, comprising:

an alternating current regulating means having a power input terminal for connection to the source of alternating current, a controlled power output terminal for connection to a motor and means for accepting a control signal for controlling the power flow between said terminals;

potential sensing means adapted to be coupled in parallel with at least a portion of said motor;

a phase discriminating amplitude-responsive control means for delivering a control signal which is responsive to an alternating current signal;

said control means coupled to said potential sensing means and adapted for connection to said motor for obtaining therefrom a signal comprising the difference in alternating current potential existing between a point on said potential means and a point on the motor windings;

and means for coupling said regulating means to said control means for controlling the power flow between said terminals in response to said control signal.

17. A control system as set forth in claim 16 wherein said control means regulates the power flow between said terminals in response to the phase and amplitude of said alternating current signal.

18. A control system as set forth in claim 16 wherein said potential sensing means has a tap, and said control means is coupled to said tap and adapted to be connected to a common point between the armature and a field winding of the motor.

19. A control system as set forth in claim 18 wherein said potential sensing means comprises resistive means having a moveable tap.

20. A control system for an alternating current motor having armature and field windings serially connected, adapted for connection of said motor between an alternating current source and a controlled power terminal, comprising:

an alternating current regulating means having a power input terminal for connection to the source of alternating current, a controlled power output terminal for connection to a motor, and means for accepting a control signal for controlling the power flow between said terminals;

current sensing means adapted for connection at least partially in series with the motor to form a motor circuit;

potential sensing means adapted to be coupled in parallel with at least a portion of the motor circuit;

a phase discriminating amplitude-responsive control means for delivering a control signal which is responsive to an alternating current signal;

said control means coupled to said potential sensing means and to said motor circuit for obtaining therefrom an alternating current signal comprising the difference in alternating current potential existing between a point on said potential means and a point on said motor circuit;

and means for coupling said regulating means to said control means for controlling the power flow between said terminals in response to the said control signal.

21. A control system as set forth in claim 20 wherein said control means regulates the power flow in accordance with the phase and amplitude of said alternating current signal.

22. A control system as set forth in claim 20 wherein said potential sensing means has a tap;
said current sensing means comprises an impedance for connection in series with the alternating current regulating means and the motor;
and said control means is connected between said tap and a point on said current sensing means.

23. A control system as set forth in claim 22 wherein the potential sensing means comprises resistive means having a moveable tap.

References Cited

UNITED STATES PATENTS

| | | | |
|---|---|---|---|
| 2,977,523 | 3/1961 | Cockrell | 318—345 X |
| 3,064,174 | 11/1962 | Dinger | 318—345 X |
| 3,095,534 | 6/1963 | Cockrell | 318—345 X |
| 3,189,811 | 6/1965 | King | 318—345 X |
| 3,191,113 | 6/1965 | Gargani | 318—341 X |
| 3,229,182 | 1/1966 | Kubler | 318—345 X |

ORIS L. RADER, *Primary Examiner.*

J. C. BERENZWEIG, J. J. BAKER, *Assistant Examiners.*